(12) United States Patent
Manjunath et al.

(10) Patent No.: US 6,408,028 B1
(45) Date of Patent: Jun. 18, 2002

(54) DIFFUSION BASED PEER GROUP PROCESSING METHOD FOR IMAGE ENHANCEMENT AND SEGMENTATION

(75) Inventors: Bangalore S. Manjunath, Goleta; Charles Kenney, Santa Barbara, both of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/088,531

(22) Filed: Jun. 1, 1998

Related U.S. Application Data

(60) Provisional application No. 60/047,367, filed on Jun. 2, 1997, and provisional application No. 60/047,364, filed on Jun. 2, 1997.

(51) Int. Cl.7 .............................................. H04N 7/34
(52) U.S. Cl. .................... 375/240.08; 382/243
(58) Field of Search ...................... 375/240.08; 382/243

(56) References Cited

U.S. PATENT DOCUMENTS

| | | | |
|---|---|---|---|
| 4,906,940 A | | 3/1990 | Greene et al. |
| 4,991,092 A | | 2/1991 | Greensite |
| 5,047,853 A | * | 9/1991 | Hoffert et al. ......... 375/240.01 |
| 5,109,435 A | | 4/1992 | Lo et al. |
| 5,235,434 A | | 8/1993 | Wober |
| 5,237,432 A | | 8/1993 | Calarco et al. |
| 5,247,583 A | | 9/1993 | Kato et al. |
| 5,274,715 A | | 12/1993 | Hsu |
| 5,293,430 A | | 3/1994 | Shiau et al. |
| 5,311,305 A | | 5/1994 | Mahedevan et al. |
| 5,341,226 A | | 8/1994 | Shiau |
| 5,390,259 A | | 2/1995 | Withgott et al. |
| 5,511,153 A | | 4/1996 | Azarbayejani et al. |
| 5,513,282 A | | 4/1996 | Williams |
| 5,539,843 A | | 7/1996 | Murakami et al. |
| 5,544,286 A | * | 8/1996 | Laney ...................... 358/1.15 |
| 5,568,572 A | | 10/1996 | Shu |
| 5,581,358 A | | 12/1996 | Seto et al. |
| 5,592,599 A | | 1/1997 | Lindholm |
| 6,091,850 A | * | 7/2000 | Ostrovsky ................ 382/166 |

* cited by examiner

Primary Examiner—Howard Britton
(74) Attorney, Agent, or Firm—John P. O'Banion

(57) ABSTRACT

An image processing method wherein a "peer group" is identified for each pixel in the image and the peer group is then used to make processing decisions at that pixel. A diffusion form of peer group processing is presented that averages over the peer group (PGA). Two parameters provide direct control over which objects are selectively enhanced: area (number of pixels in the object) and window diameter (window size needed to enclose the object). The direct correspondence between these parameters and the object characteristics is in sharp contrast to parameter selection for other image processing methods such as variational approaches in which it is unclear how to select good values for the smoothness and approximation weights. The scale space decomposition of an image determined by using the peer group number as the scale parameter leads to top hat procedures for recovering objects in a given size range.

6 Claims, 13 Drawing Sheets

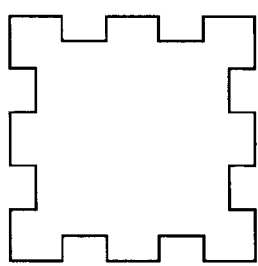
FIG. 5(c)
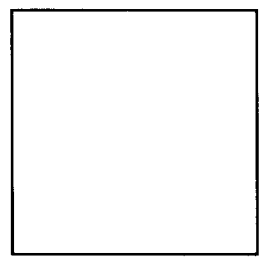
FIG. 5(b)
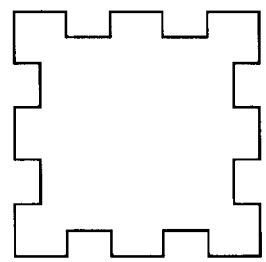
FIG. 5(a)

DIFFUSION BASED PEER GROUP PROCESSING METHOD FOR IMAGE ENHANCEMENT AND SEGMENTATION

CROSS-REFERENCE TO RELATED APPLICATIONS

This application claims priority from U.S. provisional application Ser. No. 60/047,367 filed on Jun. 2, 1997, and from U.S. provisional application Ser. No. 60/047,364 filed on Jun. 2, 1997, both of which are incorporated herein by reference.

STATEMENT REGARDING FEDERALLY SPONSORED RESEARCH OR DEVELOPMENT

This invention was made with Government support under Grant No. N00014-96-1-0456 awarded by the Office of Naval Research. The Government has certain rights in this invention.

REFERENCE TO A MICROFICHE APPENDIX

Not Applicable

NOTICE OF MATERIAL SUBJECT TO COPYRIGHT PROTECTION

All of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever.

PUBLICATIONS INCORPORATED BY REFERENCE

The following publications which are referenced using a reference number inside square brackets (e.g., [1]) are incorporated herein by reference.

[1] D. L. Donoho and I. M. Johnstone, "Ideal De-Noising in a Basis Chosen from a Library of Orthogonal Bases," Comptes Rendus Acad. Sci. Paris A, 319, (1994), pp. 1317–1322.

[2] Edward R. Dougherty, "An Introduction to Morphological Image Processing," Tutorial Texts in Optical Engineering, vol. TT9, SPIE Optical Engineering Press, Bellingham, Wash. 1991.

[3] E. Abreu, M. Lightstone, S. K. Mitra and K. Arakawa, "A new Efficient Approach for the Removal of Impulse Noise from highly Corrupted Images," IEEE Trans. on Image Processing, vol. 5 (1996), pp. 1012–1025.

[4] Mary Oman, "Study of Variational Methods Applied to Noisy Step Data," unpublished, 1996.

[5] James M. Ortega, "Matrix Theory A Second Course," Plenum Press, New York, 1987.

[6] S. Osher and L. Rudin, "Feature-Oriented Image Enhancement Using Shock Filters," SIAM J. Numer. Anal., vol. 27, pp. 919–940, 1990.

[7] S. Osher and L. Rudin, "Shocks and Other Nonlinear Filtering Applied to Image Processing," Proceedings SPIE Appl. Dig. Image Proc. XIV, vol. 1567, pp. 414–430, 1991.

[8] L. Rudin, "Images, Numerical Analysis of Singularities, and Shock Filters," Ph.D. thesis, Computer Science Dept., Caltech, Pasadena, Calif., Tech. Report 5250:TR:87, 1987.

[9] L. P. Yaroslavsky, "Linear and Rank Adaptive Filters for Picture Processing," in Digital Image Processing and Computer Graphics: Theory and Applications, L. Dimitrov and E. Wenger, Eds. Wien, Muenchen: R. Oldenburg, pp. 374, 1991.

[10] L. Yin, R. Yang, M. Gabbouj and Y. Neuvo, "Weighted Median Filters: A Tutorial," IEEE Trans. Circ. Sys. -II: Analog and Dig. Sig. Proc., vol. 43 (1996) pp. 157–192.

BACKGROUND OF THE INVENTION

1. Field of the Invention

This invention pertains generally to image processing, and more particularly to a fast image processing method that selectively segments and enhances objects of a given diameter and area.

2. Description of the Background Art

In most computer vision applications, image enhancement and image segmentation constitutes a crucial initial step before performing high-level tasks such as object recognition and scene interpretation. However, despite considerable research and progress made in this area, the robustness and generality of the algorithms on large image datasets have not been established. Furthermore, image segmentation itself is an ill-posed problem. It requires additional information from the user in order to select a proper scale for detecting the useful edges or boundaries, and thus, segmenting the objects or detecting the useful edges or boundaries, and thus, segmenting the objects or regions of interest.

BRIEF SUMMARY OF THE INVENTION

The present invention generally comprises two steps to enhance objects with n or more pixels: (a) identify a peer group of size n for each pixel; and (b) process the pixel value based on the characteristics of the peer group. More particularly, the invention comprises a method that identifies, at each pixel in an image, a nearby group (peer group) of similar pixels. Using a window diameter d and a peer group number n, the peer group for a pixel is selected from the window centered at the pixel and consists of the n pixels whose values are closest to the center value. For example, the pixel similarity criteria for assignment to a peer group might be intensity nearness. Once the peer group is identified, the values are averaged to obtain a new pixel value for the center pixel. This method eliminates noise spikes and gives a piecewise constant approximation of the original image.

There are many ways to select the peer group for a given pixel. For example, see the earlier work by Yaroslavsky [9] presenting an abstract formulation of the group idea. In general, peer group members should share common values. For a single image, the peer group may be nearby pixels with similar intensity values. For a sequence of images used in determining optical flow fields, the peer group can be nearby pixels (in time and space) with similar intensity values and similar velocity values. In another context, texture values may be assigned to each pixel and then the peer group determined by nearness in texture space.

By way of example, and not of limitation, the present invention is directed to peer group averaging (PGA) for peer groups based on intensity nearness. For a given image g, we select a window diameter d and a peer group number n. The selection of d and n should correspond to the size of the objects that are to be enhanced and segmented. The peer group for a pixel is selected from the window centered at the pixel and comprises the n pixels whose intensity values are closest to the center value. For example, let u be the average over the peer group. If we let $A_k$ be the averaging operator at step k we can represent the PGA iteration as $u_{k+1}=A_k u_k$ where $u_0=g$.

The PGA iteration is nonlinear because of the peer group selection. During the first few iterations the peer groups can change membership significantly. After this transition phase the peer groups remain rather static. This suggests fixing the peer groups after a certain number of iterations (say for $k \geq k_0$). The PGA iteration then has the form $u_{k+1}=Au_k$ for $k \geq k_0$ where A is independent of k. This linear iteration is fast (since the peer group selection is not done at each step) and can be analyzed (See Theorem 2 below).

Convergence of the PGA iteration for one dimensional (1d) signals and images is discussed in Section 1 below, followed by a discussion of how to achieve efficiency for large window sizes. The main result discussed in that section is that the PGA algorithm converges to an image that is constant on the interior regions of the image (the "irreducible" subsets discussed in Theorem 2 below). Section 1 concludes with a discussion of the connection between PGA and shock filtering methods.

In Section 2 below, we also address the problem of parameter selection for PGA. The first part of Section 2 discusses some empirical observations and supporting examples. This is followed by analytical results on the interplay between window diameter, peer group number and the object of interest.

Lastly, in Section 3 we briefly discusses an application to size related filtering.

An object of the invention is to provide an image processing method with edge preservation and enhancement.

Another object of the invention is to provide an image processing method that exhibits computational speed and ease of implementation, especially in comparison to more computationally intensive methods such as PDE based segmentation schemes.

Another object of the invention is to provide an image processing method that allows may analytical results to be obtained concerning the convergence of the PGA iteration, relations to other methods such as shock filtering and median filtering, and how the choice of parameters affects the resulting approximation.

Another object of the invention is to provide an image processing method directly related to the characteristics of the image objects that are to be enhanced.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 2(a) shows an original image, FIG. 2(b) shows a noisy version of the image shown in FIG. 2(a), FIG. 2(c) shows the result of applying PGA in accordance with the present invention with n=85, FIG. 2(d) shows the result of applying PGA in accordance with the present invention with n=256, FIG. 2(e) shows the sorted intensity values for n=85 (noisy data shown with *), and FIG. 2(f) shows the sorted intensity values for n=256 (noisy data shown with *).

FIG. 3(a) shows a 1d signal example consisting of two steps of different heights and widths together with Gaussian noise. FIG. 3(b) shows a PGA approximation in accordance with the present invention for n=2. FIG. 3(c) shows a PGA approximation in accordance with the present invention for n=9. FIG. 3(d) shows a PGA approximation in accordance with the present invention for n=11. Noisy data is shown with an asterisk.

FIG. 4(a) shows a lace image from the Brodatz texture album. FIG. 4(b), FIG. 4(c) and FIG. 4(d) show the PGA approximation for this image for window diameter d=3 and peer group numbers n=4, 6 and 8, respectively.

FIG. 5(a) through FIG. 5(c) are crenelated rectangle examples. FIG. 5(b) shows the result of removing the "noisy" smaller rectangle at the upper left of FIG. 5(a). FIG. 5(c) is the result using the PGA approximation in accordance with the present invention.

DETAILED DESCRIPTION OF THE INVENTION

1. CONVERGENCE 1.1 Monotone Functions

Figure 1A:
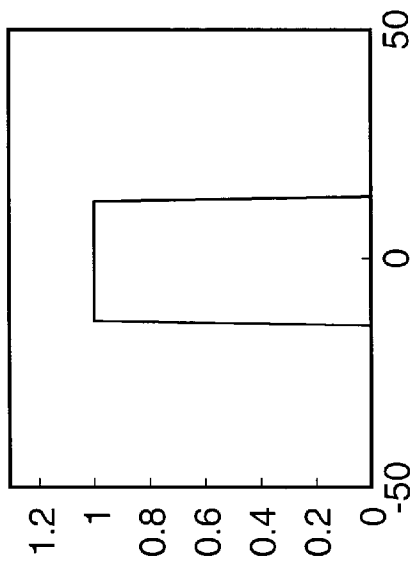
FIG. 1(a) through FIG. 1(d) are graphs showing the Gaussian function g for $\sigma=10$, the PGA approximation u for n=2 and d=3, median filtering for a window of size d=11, and median filtering for a window of size d=51, respectively.

Assume that the given signal g is monotonically increasing. The peer group for pixel i is determined by nearness of intensity values to g(i); in cases of ambiguity caused by equal intensity differences, we select the peer group to minimize the distance of the peer group members from pixel i, with preference to the right if necessary.

Lemma 1 For monotone increasing functions, the peer group for pixel i is a connected interval of the form $[l_i, r_i]$ with $l_i \leq i \leq r_i$.

Proof: Obvious.

Definition: For a monotonically increasing function g, let $[l_i, r_i]$ denote the peer group interval for pixel i.

Lemma 2 PGA preserves monotonicity.

Proof: The peer group interval for pixel i lies to the left of the peer group interval for pixel i+1 in the sense that $l_i \leq l_{i+1}$ and $r_i \leq r_{i+1}$. The first iteration of the PGA algorithm averages over these intervals to produce $u_1$. Since g is monotonically increasing, the averages also monotonically increase as we move the peer group interval from left to right: $u_1(i+1) \geq u_1(i)$.

Theorem 1 Let g be monotonically increasing over [1, n] with a change in convexity at k in the sense that $g(i-1)-2g(i)+g(i+1)>0$ for $i \leq k$ and $g(i-1)-2g(i)+g(i+1)<0$ for $i>k$. For a peer group size of n=2, the PGA algorithm applied to g converges to a bimodal piecewise constant function u with x=k as the boundary point for the two constant regions: $u(i)=(g(1)+g(2))/2$ for $i>k$ and $u(i)=(g(n-1)+g(n))/2$ for $i>k$.

Proof: For $i \leq k$, the convexity assumption can be written as $g(i+1)-g(i)>g(i)-g(i-1)$. Since g is monotonically increasing, both sides of this inequality are nonnegative. Consequently, for $i \leq k$, the value g(i) is closer to g(i-1) than to g(i+1). This means for $2 \leq i \leq k$, the peer group for pixel consists of pixels i−1 and i; i.e., we are averaging to the left. For i=1, the peer group consists of pixels 1 and 2. It is easy to show that under this type of averaging both the monotonicity and convexity of the function are preserved. Thus the peer groups remained fixed. In particular, the peer group for pixels 1 and 2 are identical. Thus these function values converge in one step to their average and then remain constant. Since the pixels $2 < i \leq k$ are left averaging, they converge to the common value of pixels 1 and 2; i.e. to (g(1)+g(2))/2. Similar arguments show that the function values of pixels $k < i \leq n$ converge to the common value (g(n−1)+g(n))/2 which completes the proof.

1.2 Arbitrary Signals

Theorem 1 shows that the PGA algorithm gives exactly the expected result for boundary detection in the sense of finding zero-crossings of the Laplacian: at the point where the convexity changes from positive to negative the Laplacian is zero. The proof of Theorem 1 can be easily modified to give a convergence result for arbitrary 1d functions g. Suppose that g is convex or concave in the interval I defined by $k_0 \leq i \leq k_1$. Then the PGA algorithm with peer group size 2 and window size 3 converges to a constant value c in the interval I. The value c is equal to the average of the two closest consecutive values of g in I. Thus the PGA algorithm converges to a piecewise constant function with the regions of constancy determined by the convexity breakpoints (i.e. those points for which g(i−1)−2g(i)+g(i+1) changes sign) of the original function g.

1.3 Comparison with Median Filtering

Median filtering forms an approximation of u of a signal g by passing a window diameter d over g and taking the median of the window at pixel i as the value for u(i). The motivation for this type of filtering is that the median preserves edges for 1d signals. For two dimensional (2d) images, this motivation breaks down somewhat since the median preserves straight edges but not corners. This has motivated research into separable median filters and other types of related filters (see the tutorial paper [10] by Yin et al. which includes an extensive bibliography for this area) including rank-ordered median filters [3]. The next example compares median filtering with PGA for a Gaussian hump.

EXAMPLE 1

Figure 1B:
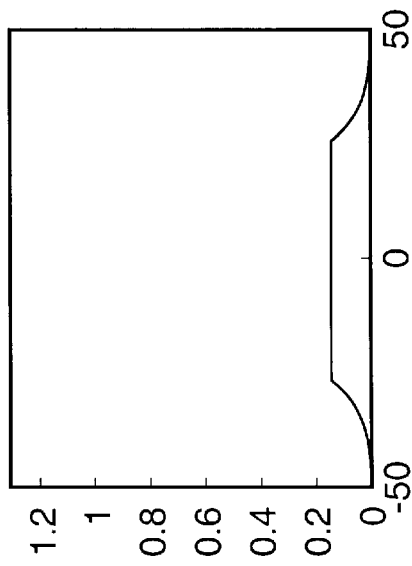
Figure 1C:
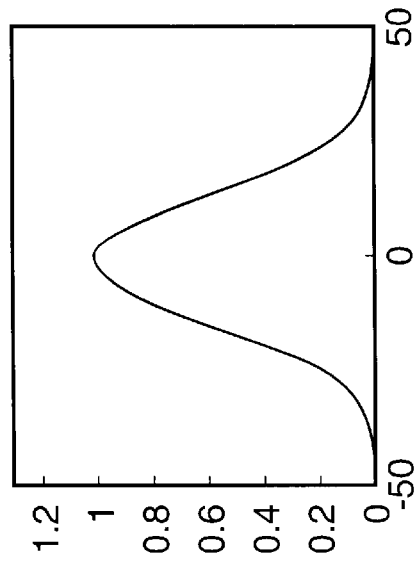
Figure 1D:
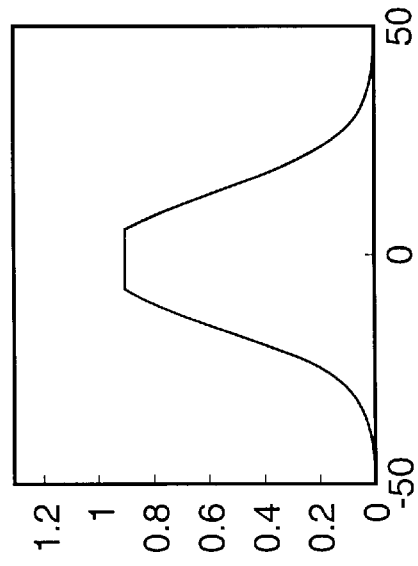

Let g be the Gaussian function $g(x)=e^{-x^2/2\sigma^2}$. FIG. 1(a) shows g for σ=10. FIG. 1(b) shows the PGA approximation u for n=2 and d=3. The break points in u occur at x=±σ which are also the zero-crossings of g. In contrast the median filter results do not depend on the variance of the Gaussian; instead the breakpoints are determined entirely by the window diameter as seen in FIG. 1(c) for a window of size d=11 and FIG. 1(d) for a window of size d=51.

1.4 PGA and Shock Filtering

In shock filtering [6], [7], [8] intensity values from the interior of regions move outward towards the region edges along gradient lines. The convexity of the intensity along the gradient direction determines the motion direction along the gradient and this direction assignment means that when two regions meet at an edge the image intensity will experience a jump. Thus the edges of the image correspond to stationary shock fronts for this type of image processing.

In shock filtering the maximum values of the image intensity and the minimum values move outward from the interior of their regions to meet at the boundaries. This means that the contrast at the edges is maximized. This also means that shock filtering preserves the total variation of the original image.

Shock filtering smoothes in the sense that each region assumes a constant value. However, shock filtering does not remove isolated noise such as salt-and-pepper noise, as discussed by Osher and Rudin in [6].

In its simplest form for 1d signals, shock filtering uses the original signal g as initial data for a non-linear convection equation:

$$u_t = -\text{sgn}(u_{xx})u_x \text{ with } u(x,0)=g(x).$$

In this formulation we must be careful to form derivative approximations from the appropriate direction. Thus, if intensity information is to move from right to left, then we want $u_x$ to represent the right-hand derivative and we use a forward difference to approximate $u_x$. Similarly we use a backward difference if we want intensity information to move from left to right.

Consider a simple Euler update scheme for the shock filter equation: let h be the time step and set $u_i^{new}=u_i+hu_i$. If u is monotone increasing at i and $u_{xx}>0$ in the sense that $u_{i+1}-2u_i+u_{i-1}<0$, then the choice h=½ leads to $u_i^{new}=(u_i+u_{i+1})/2$. This is the same result we would get with PGA for a peer group of size n=2 because the convexity condition $u_{i+1}-2u_i+u_{i-1}<0$ is the same as $|u_{i+1}-u_i|<|u_i-u_{-1}|$ when u is monotone increasing. Similarly, if $u_{xx}>0$ the choice h=½ in the shock filter Euler update leads to the same result as the PGA update: $u_i^{new}=(u_{i-1}+u_i)/2$.

This intersection of shock filtering and PGA for particular parameter choices means that results for one method apply immediately to the other. For example, PGA with n=2 for signals is total variation preserving because the same is true for shock filtering. However, the two methods are not the same for other choices of parameters. In particular PGA with larger peer group sizes automatically incorporates smoothing over the peer group and is able to handle problems such as the isolated intensity spikes of salt and pepper noise.

1.5 Efficiency for Large Peer Groups

In determining the peer group for pixel i, the main computational cost occurs in finding the n smallest differences |u(i)−u(j)| for each j in the window about i. Thus PGA is fastest for small peer groups and window sizes. However, to detect large objects in the image, we want the window size and the peer group number to be large. To avoid excessive computation, there is an approach that can reduce processing times for large peer groups.

Consider the limiting case in which the window is large enough to include the entire image $\tilde{g}$. Sort the image values by intensity and store the result as a monotone increasing vector g. Let i be the index for g corresponding to pixel $\tilde{i}$. That is, for $\tilde{i}=(i_1, i_2)$ we have $g(i)=\tilde{g}(\tilde{i})$.

Since g is monotone, Lemma 1 tells us that the peer group for i is an interval $(l_i, r_i)$ containing i. The peer group has n members so $r_i=l_i+n-1$. Thus we only need to find $l_i$. The value of $l_i$ is determined by comparing the right-hand difference of $g(r_i)-g(i)$ with the left hand difference $g(i)-g(l_i)$: if the right hand difference is larger than the left-hand difference we need to decrease $l_i$; otherwise increase $l_i$. Since the peer group is of size n and must include i we see that $i-n+1 \leq l_i \leq i$. This leads to a binary search test requiring at most $\log_2(n)$ differences and comparisons. For example, if we want to look for large objects using a peer group size of 4086, then 12 comparisons suffice to find the peer group interval for each pixel. This represents a tremendous reduction in the work load is over the regular PGA for large window sizes. As a further reduction in the computational burden, we can update the sums $s_i = \sum_{l_i}^{r_i} g(j)$ (which are needed in finding the new intensity values for the pixels) by adding the values from the right and subtracting values from the left. This gives a considerable reduction of effort over straightforward evaluation of the sums $s_i$. Additionally, after the first few iterations the peer group structure changes very little, so that we can revert to a fixed PGA scheme with little difference in the final result.

EXAMPLE 2

Figure 2A:
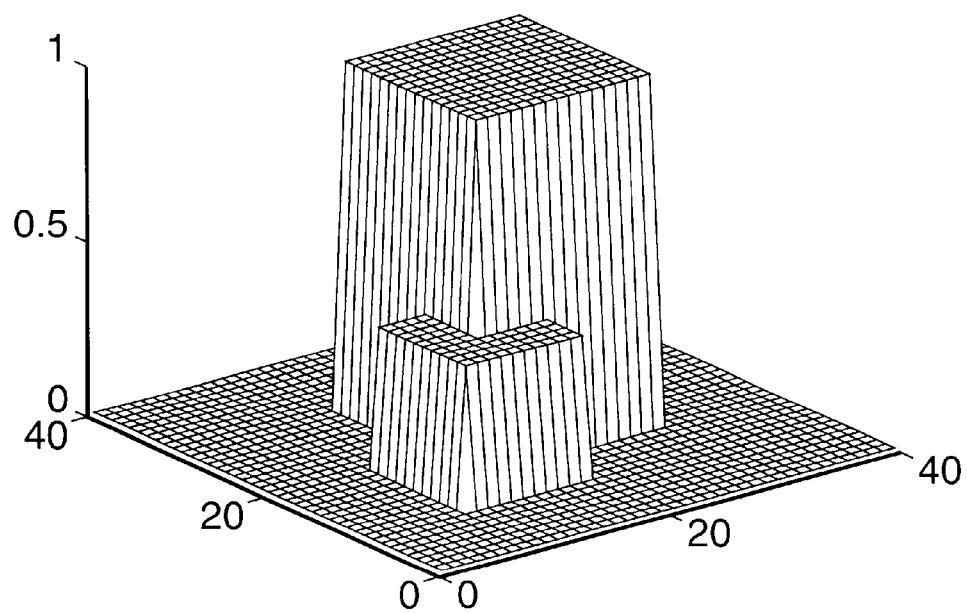
FIG. 2(a) through FIG. 2(f) are graphs representing a noisy block example.
Figure 2B:
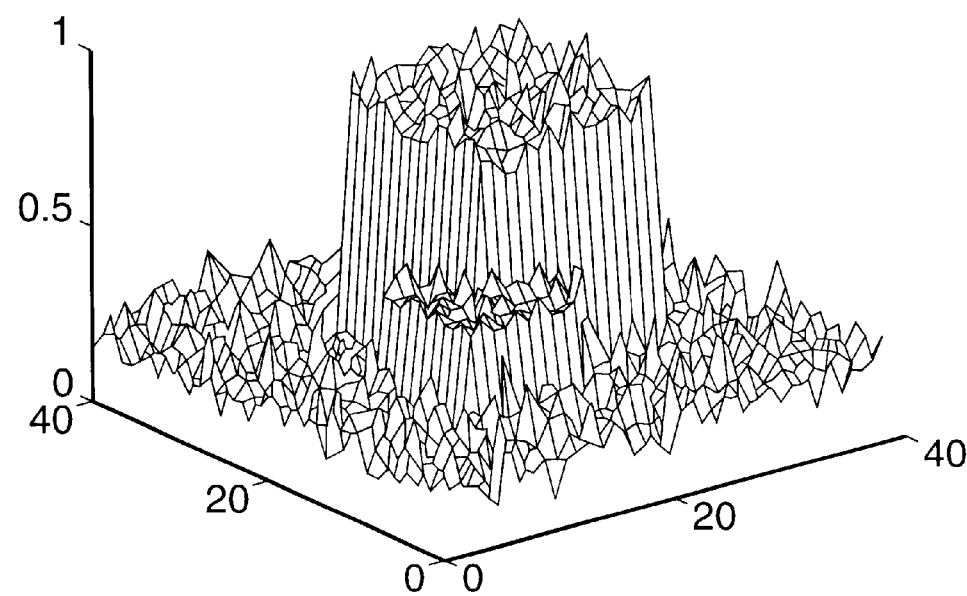
Figure 2C:
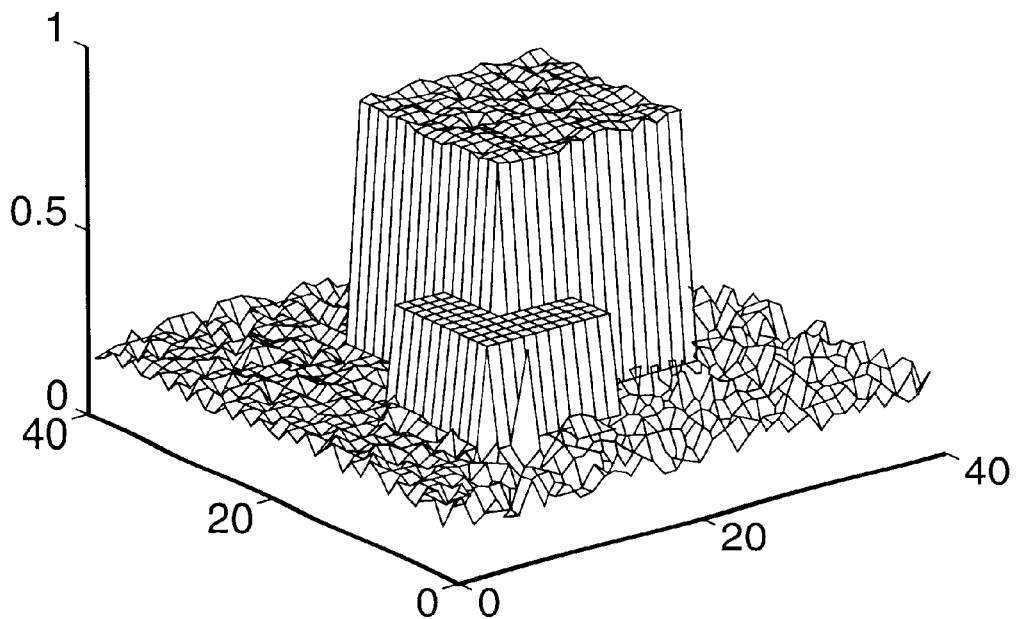
Figure 2D:
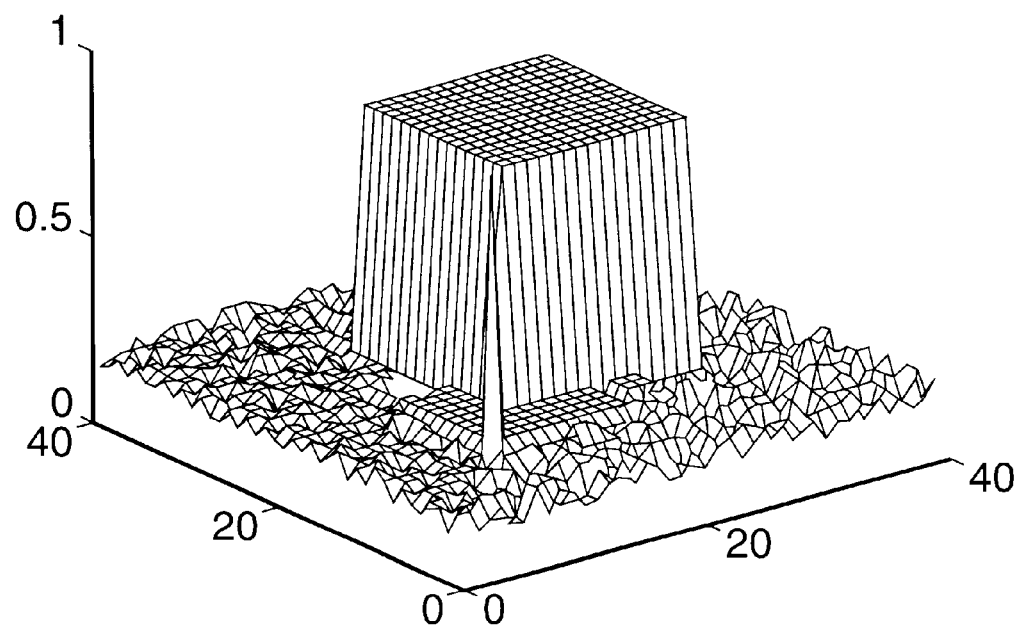
Figure 2E:
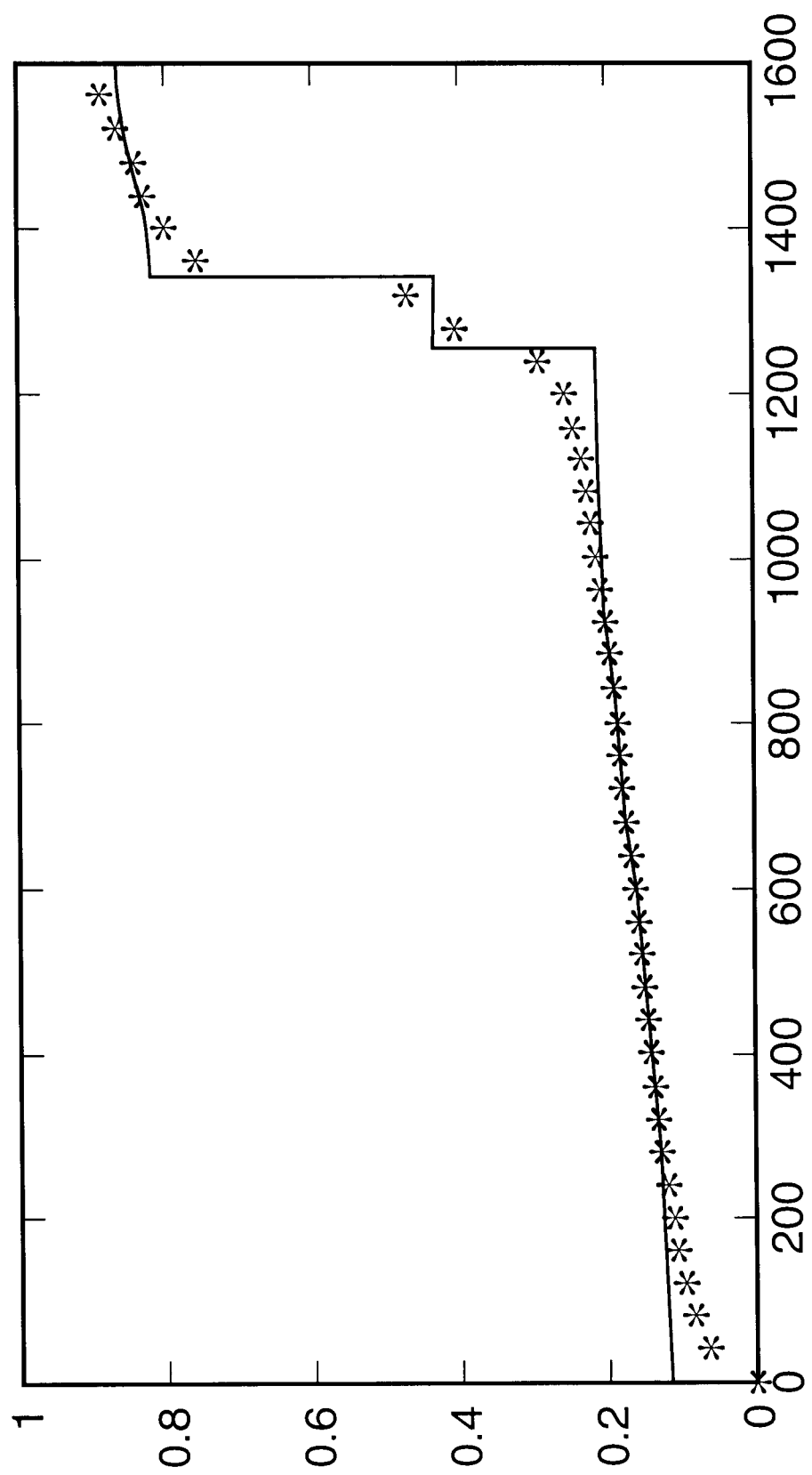
Figure 2F:
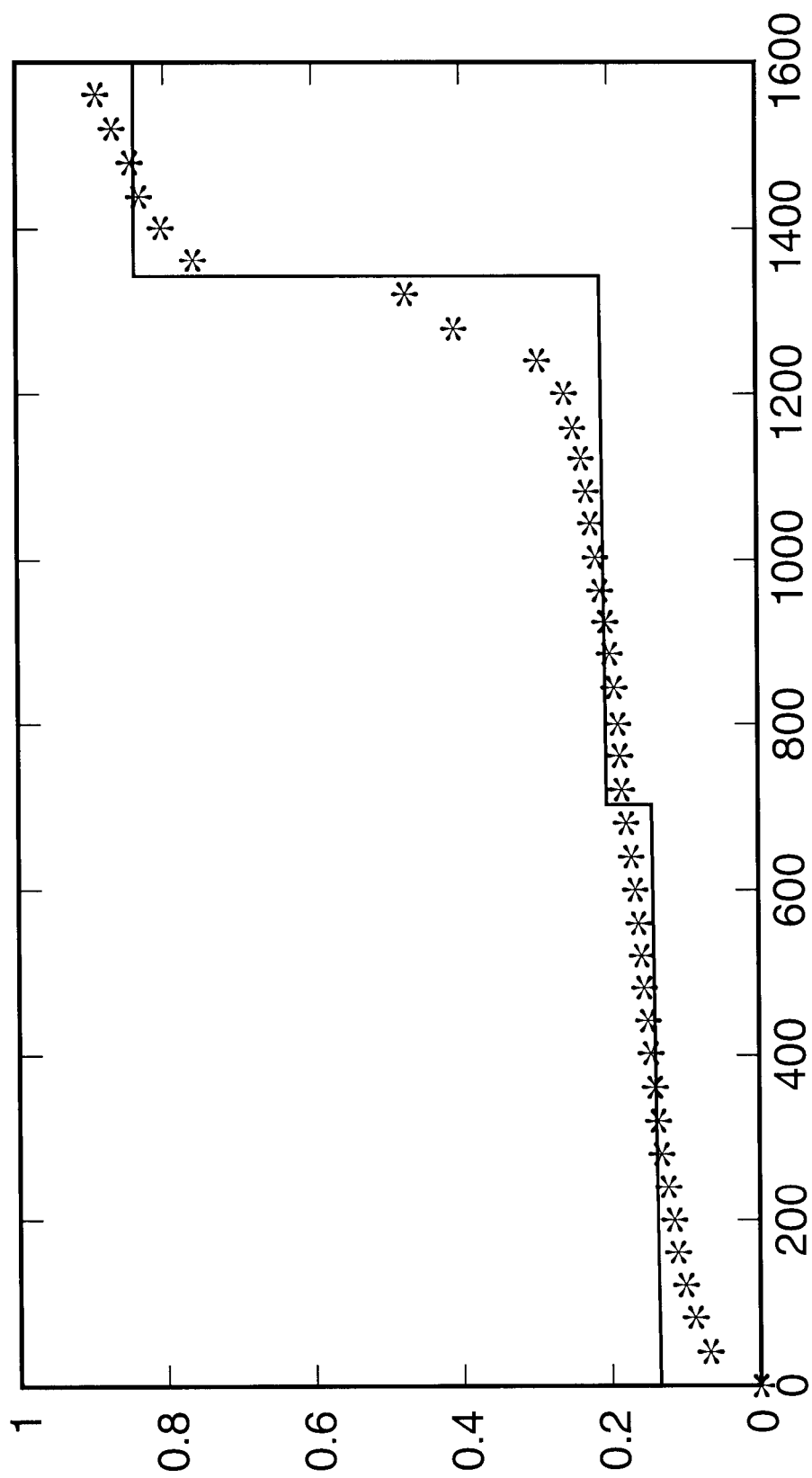

To illustrate these ideas, consider the block image shown in FIG. 2(a) and a noisy version of this image in FIG. 2(b). FIG. 2(c) and FIG. 2(d) show the result of applying PGA with n=85 and n=256, respectively, with a large window equal to the entire image. In each case the approximation captures the object of size corresponding to the two peer group sizes. (See the remarks at the beginning of Section 2 and Section 3). FIG. 2(e) and FIG. 2(f) show the sorted intensity values for the clean block image and noisy block image.

For "big" window PGA we have found it best to first preprocess the image with regular PGA with a small peer group to eliminate noise. The reason for this is that for a fixed peer group size, as the window size increases the population from which we can draw the peer group increases and it is more likely that individual members will be close to the given pixel value. Hence increasing the window size decreases the change from iteration to iteration and results in potentially less noise removal.

1.6 General Convergence for Fixed PGA

In the course of testing numerical examples under the PGA algorithm we observed that the peer groups can change significantly during the first few iterations. This is then followed by a period during which there is little or no change in the peer group structure. The nonlinearity of the PGA algorithm is tied solely to the selection of the peer group members. Thus for efficiency and ease of analysis we consider a modified version of the PGA algorithm in which membership in the peer groups is fixed after a certain number of regular PGA steps. The following theorem gives a convergence result for this "fixed" PGA approach.

Theorem 2 Let the sequence $u_k$ be generated using the PGA algorithm, starting from $u_0=g$, with fixed peer groups for each pixel after iteration $k_0$. Then the sequence $u_k$ converges to a limiting image u.

Proof: For brevity we will only sketch the idea of the proof. After the peer groups are fixed the PGA iteration can be written as $x_{k+1}=Ax_k$ where the vector $x_k$ is formed by stacking the columns of the image $u_k$ and the matrix A does the peer group averaging. (Thus PGA is linear after the peer groups are fixed. This permits the following analysis). The entries of the rows of A sum to 1 and consist of either 0 or 1/n, where n is the peer group number. We say that a subset S of pixels is strongly connected or irreducible if for each pair of pixels i and j in S there exists a diffusion path in S from i to j and a diffusion path in S from j to i. That is, there are pixels $i_1, \ldots, i_m$ in S such that $i_p$ is in the peer group of $i_{p+1}$ for p=1 to p=m with $i_1=i$ and $i_m=j$, and vice versa. The image may contain one or more irreducible subsets. For reasons that will become clear below, we refer to these subsets as the primary irreducible subsets of the image.

For any irreducible subset S, the iteration $x_{k+1}=Ax_k$ becomes $\tilde{x}_{k+1}=\tilde{A}\tilde{x}_k$; where $\tilde{x}$ are the pixel intensities in S and $\tilde{A}$ is an irreducible nonnegative matrix with row sums equal to 1. Applying the Perron-Frobenius Theorem [5], we see that $\tilde{A}$ has a simple eigenvalue of largest modulus and all other eigenvalues are of smaller modulus. Because the row sums are 1, we have $\lambda_{max}(\tilde{A})=1$ with associated eigenvector $v=(1, \ldots, 1)^T$. Since $\tilde{x}_{m+k_0}=\tilde{A}^m\tilde{x}_{k_0}$, we have $\tilde{x}_k$ converges to $\tilde{x}=cv$ where c is the projection of $x_{k_0}$ onto v; i.e., c is the average of the entries of $x_{k_0}$.

Now repeat this for each irreducible subset of pixels. From this analysis we is see that the limiting image u under the PGA algorithm is constant on each primary irreducible region of the image.

The remaining pixel intensities satisfy a recursion of the form $\hat{x}_{k+1}=\hat{A}\hat{x}_k+\hat{b}_k$ where $\hat{b}_k$ represents the contribution to the averaging of the irreducible sets of pixels. Again determine the irreducible subsets of pixels with respect to $\hat{A}$. These subsets are the secondary irreducible subsets of the image. The PGA iteration on these subsets has the form $\overline{x}_{k+1}=\overline{A}\overline{x}_k+\overline{b}_k$; where $\overline{A}$ is irreducible and has spectral radius less than 1. Thus this iteration converges to $\overline{x}=(I-\overline{A})^{-1}\overline{b}$ where $\overline{b}$ is the limiting value of $\overline{b}_k$.

Thus, the value of the limiting image u on the secondary irreducible subsets of the image is determined by the constant values on the primary irreducible subsets.

Repeating this process as many times as needed accounts for all the pixels and completes the proof of convergence.

2. PROPERTIES OF PGA AND PARAMETER SELECTION

The most immediate property of PGA processing is the invariance of objects for properly selected parameters. To clarify, if a group of n pixels all have the same intensity value and the maximum distance between pixels is equal to r, then by setting the peer group number set equal to n and the window diameter equal to d=2r, the common intensity value of this group of pixels is preserved under PGA processing. This property is stable with respect to noise in the following sense. If the intensity values of the object are perturbed by noise that is small enough in magnitude so that the membership in the peer group of the object is not changed, then under PGA processing the pixel values of the object converge in one iteration to their collective average. This average value is equal to the true intensity value of the object plus the average of the noise over the object. Suppose that the noise is independently and identically distributed over the pixels with mean 0 and standard deviation $\sigma$. Then the mean of intensity value assigned to the object under PGA processing is the same as the true intensity value, with standard deviation $\sigma/n$ where n is the number of pixels in the object. From this we see that PGA processing is very effective at damping out noise even for objects with only a small number of pixels.

2.1 Observations on Parameter Selection

Edge enhancement algorithms have to balance conflicting demands. On the one hand, edges of important features should be strengthened without changing their location. At the same time, we want to smooth region interiors and reduce undesirable edges associated with clutter and noise.

The extent to which these opposing goals are met is determined by the choice of the algorithm parameters. For PGA there are two parameters: window diameter d and peer group number n. The conflict between preserving edges and smoothing unwanted detail is reflected in the following observations:

(a) If n is larger than the number of pixels in an object O then O will be merged with a larger region of size at least n. In this case edges associated with O may be lost or relocated. Thus, to preserve edges in O use $n \leq n(O)$ where n(O) is the number of pixels in O.

(b) To preserve lines of pixel width w, use $n \leq wd$. This follows from identifying the line as an object O and noting that O has at most wd pixels in a window of diameter d.

(c) To preserve corners of interior angle at least $\pi/2$, identify O with a square corner with point at the center of the window. Use $n \leq d^2/4$.

(d) For 1d signals, maximal smoothing without edge loss for an object of size n(O) is obtained by setting the window diameter equal to 2n(O)−1 and the peer group number equal to n(O). If the window diameter is reduced below 2n(O) while n=n(O), then pixels just outside the object will average over some of the object pixels and edge blurring will occur. Taking n=n(O) and d=2n(O)−1 allows each pixel to select a peer group entirely to the left or entirely to the right (including the pixel itself) thus preserving the edges. This is illustrated in the noisy step signal below.

(e) As the ratio of the peer group number to the window area increases, the PGA approximation becomes smoother.

EXAMPLE 3

Figure 3A:
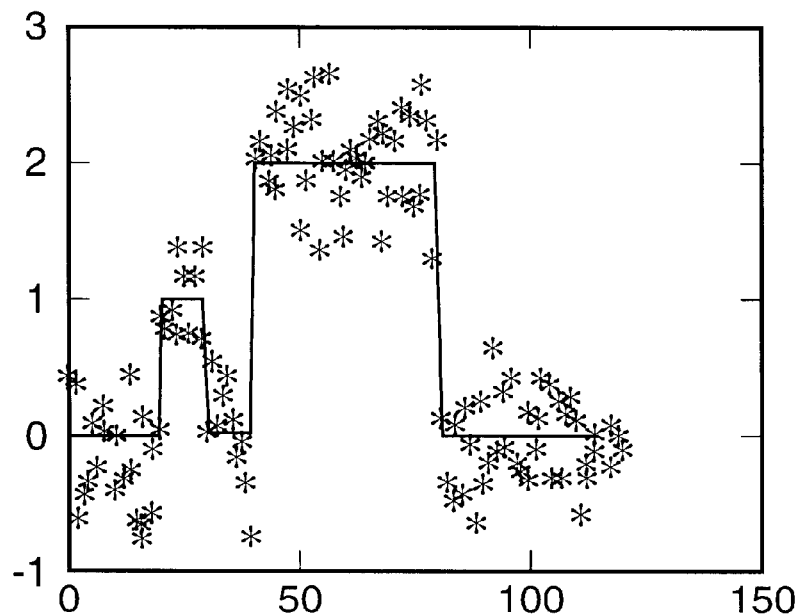
FIG. 3(a) through FIG. 3(d) are graphs representing a noisy step example.
Figure 3B:
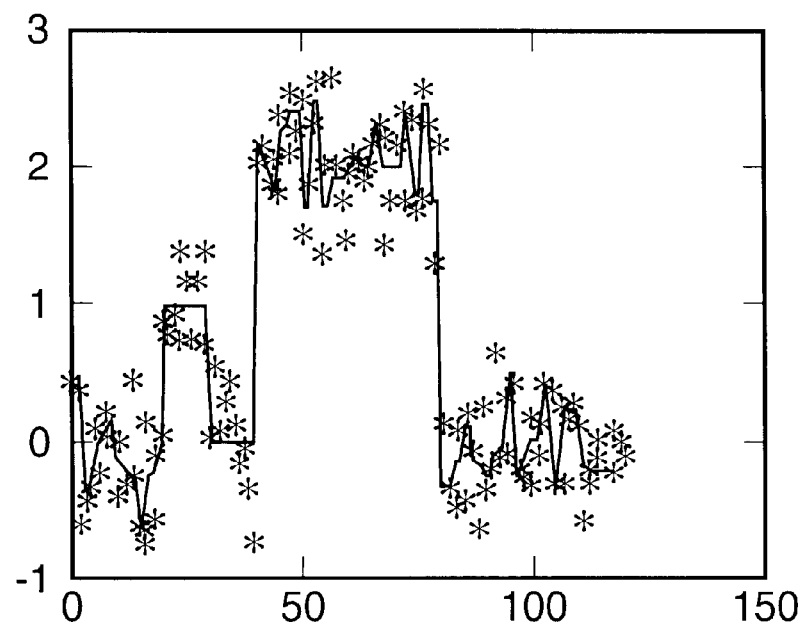
Figure 3C:
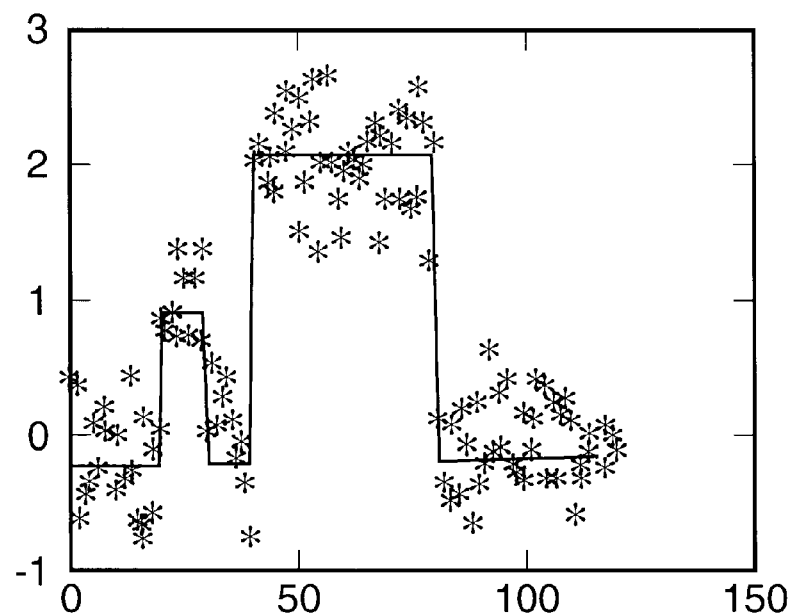
Figure 3D:
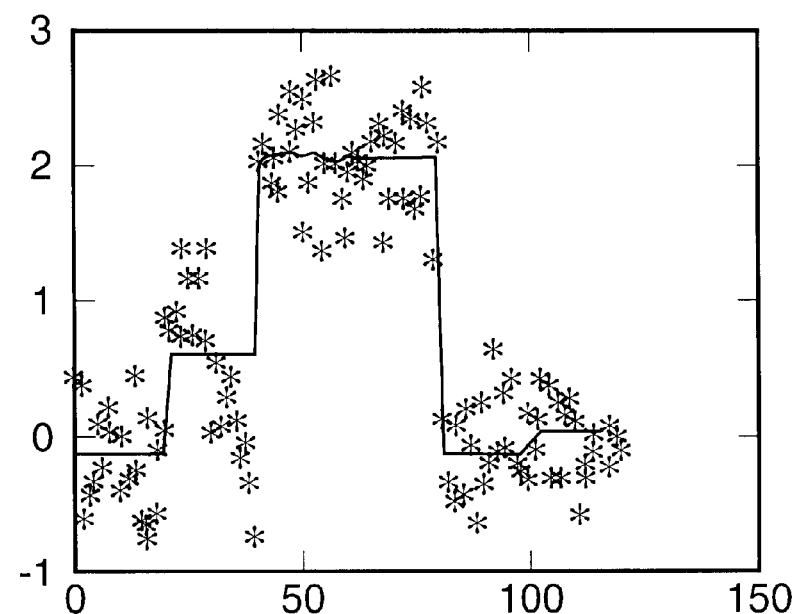

FIG. 3(a) shows a 1d signal example consisting of two steps of different heights and widths together with Gaussian noise. We ran PGA on the noisy data with n=2, 9 and 11. The window diameter in each case was d=2n−1. (See point (b) above for this choice of d). The small step has a base length of 10 pixels and the gap between the small step and the large step is also 10 pixels. For n=9, the edges of the steps and the gap are preserved, but for n=11 the gap is lost as can be seen in FIG. 3(d) because, as per point (a) above, the gap is an object of size 10. Comparing FIG. 3(b) and FIG. 3(c) for n=2 and n=9 illustrates the smoothing effect of increasing the peer group number. We also note that a similar example has been studied by Oman [4] using a variety of approximation methods including Sobolev $H^1$ reconstruction, total variation approximation, low pass Fourier reconstruction, and wavelet methods (in which denoising in the manner of Donoho and Johnstone [1] was used for Harr and Daubechies wavelets). The PGA results for n=9 are superior to (or approximately the same in the case of the total variation method) the results reported by Oman. It can be further noted that the PGA results do not use any estimate of the variance of the noise in the data.

EXAMPLE 4

Figure 4A:
FIG. 4(a) through FIG. 4(d) are images depicting PGA processing in accordance with the present invention.
Figure 4B:
Figure 4C:
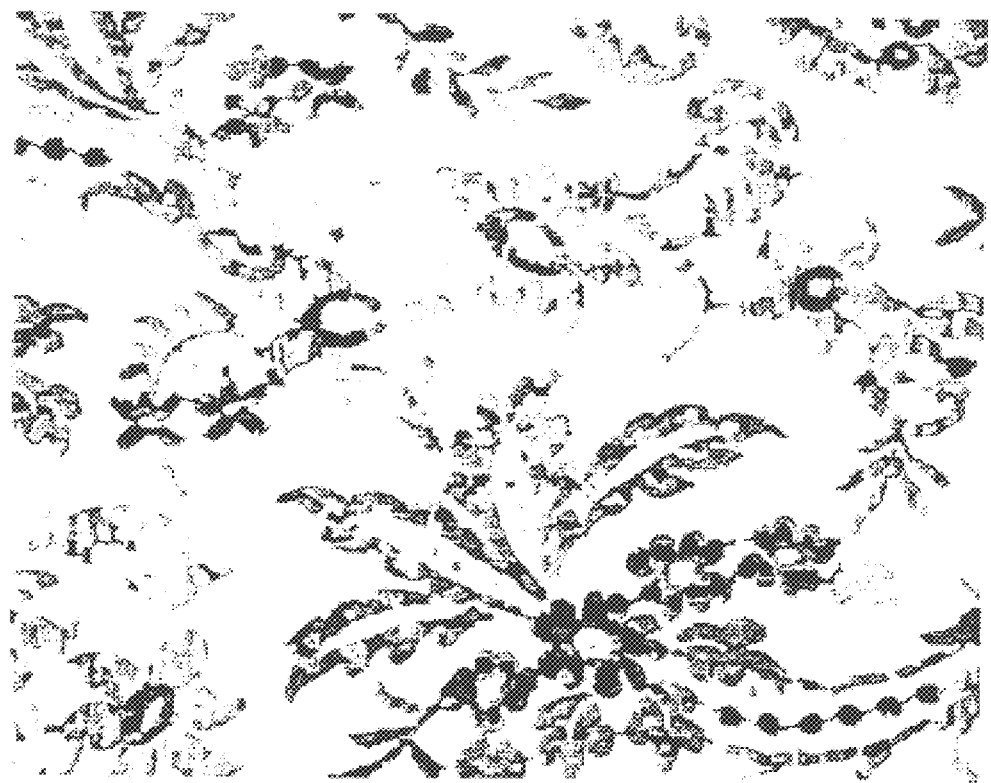
Figure 4D:

FIG. 4(a) shows a lace image from the Brodatz texture album. FIG. 4(b), FIG. 4(c) and FIG. 4(d) show the PGA approximation for this image for window diameter d=3 and peer group numbers n=4, 6 and 8. The increased smoothing is obvious as the ratio of the peer group number to the window area increases. Note that n=8 necessarily leads to a locally connected approximation as described in Lemma 4 below.

2.2 Analytic Results on Parameter Selection

The following lemma is useful in analyzing the problem of selecting the peer group number.

Lemma 3 Let R be a region with n(R) pixels. If $S_1$ and $S_2$ are subsets of R with both $n(S_1)$ and $n(S_2)$ larger than n(R)/2, then $S_1$ and $S_2$ have a nonempty intersection.

Proof: The assertion follows from the observation that $$n(S_1 \cap S_2) = n(S_1) + n(S_2) - n(S_1 \cup S_2) > n(R)/2 + n(r)/2 - n(R) = 0$$

This lemma is related to the idea of local connectivity. We say that a region R in an image g is locally connected for the peer group parameters d and n if the peer group for any pixel i in R has nonempty intersections with the peer groups of the immediate neighboring pixels for each iteration of the PGA algorithm for g. If a region R is locally connected then there are no sharp edges in R since for any two neighboring pixels the common portions of their peer groups ensure that their final values under PGA are related. For an example of this, see FIG. 5 below and the related discussion. The next two lemmas discuss conditions on the PGA parameters that lead to local connectivity for all or part of the image.

Lemma 4 If the peer group number n is large relative to the window diameter d, then the entire image is locally connected under PGA. This occurs if n>(d+1)/2 for 1d signals and if n>d(d+1)/2 for 2d images where we assume that d is odd.

Proof: For 1d signals, consider the windows $W_1$ and $W_2$ for pixel i and i+1. Let $R = W_1 \cap W_2$. This is an interval of length d−1. Let S1 be the intersection of the peer group for pixel with R. Since $W_1$ and R differ by only one pixel, $n(S_1) \geq n-1$. Similarly, let $S_2$ be the intersection of the peer group for pixel i+1 with R. Then $n(S_2) \geq n-1$. By Lemma 3, if n−1>n(R)/2 then $S_1$ and $S_2$ have a nonempty intersection, i.e., the peer groups for pixel i and i+1 intersect. Since n(R)=d−1, this condition becomes n>(d+1)/2. Thus this condition ensures that the peer groups overlap as in the statement of the lemma.

For 2d images, let $W_1$ be the window for pixel (i,j) and let $W_2$ be the window for pixel (i,j+1). The intersection $R = W_1 \cap W_2$ has d(d−1) pixels. Let $S_1$ be the intersection of the peer group for pixel (i,j) with R. Then $n(S_1) > n-d$ since $W_1$ and R differ by only d pixels. Similarly, let $S_2$ be the intersection of the peer group for pixel (i,j+1) with R. Then $n(S_2) \geq n-d$. By Lemma 3, if n−d>n(R)/2 then $S_1$ and $S_2$ must intersect. Since n(R)=d(d−1) this condition becomes n>d(d+1)/2. Thus, if this condition is satisfied all the peer groups for neighboring row pixels overlap. Apply the same reasoning to see that all the peer groups for neighboring column pixels also overlap. This completes the proof of the lemma.

Remark: The rule of thumb for Lemma 4 is that if the peer group number is slightly more than half the number of pixels in the window, then the whole image is locally connected under PGA and some smoothing will occur across edges. Sometimes this can be useful because it provides a gentle transition from the very sharp edges and small regions of small peer group numbers to complete smoothing when n is equal to the window area (i.e., just average over the entire window).

FIG. 4(d) shows the PGA approximation for n=8 and d=3 for a lace texture image from the Brodatz texture album. This value of the peer group number exceeds the cutoff value $n_c = d(d+1)/2 = 6$ of Lemma 4, so the entire image is locally connected. Nevertheless, we obtain a gentle smoothing which retains many of the features of the original image.

From the above it is clear that for a fixed window size, as the peer group number increases so does the smoothing. The next lemma discusses how the peer group number affects smoothing within regions. The idea here is to recover objects under PGA approximation in the sense that all the pixel values of the object are locally connected to each other. However we also want to avoid connections with pixels outside the object. If n>n(O) where n(O) is the number of pixels in the object O, then the peer groups for pixels in O will be forced to include pixels outside of O, resulting in edge blurring. On the other hand, if the peer group number is too small, then slight variations within O can lead to O breaking up into several smaller unconnected regions under PGA.

To analyze this problem we will make the simplifying assumption that the object O is well-separated from the rest of the image in the sense that for any peer group number $n \leq n(O)$ and any pixel $i \in O$, the peer group $P(i)$ is a subset of O.

Lemma 5 Assume that O is an object in an image g that is well-separated from the rest of g. If the peer group number n satisfies $n(O)/2 < n \leq n(O)$ then O is locally connected under PGA.

Proof: We are implicitly assuming that the window diameter d is large enough so that each peer group associated with pixels in O can lie in O. Let $S_1$ be the peer group for a pixel i in O and let $S_2$ be the peer group for another pixel j in O. By the well-separated assumption $S_1 \subset O$ and $S_2 \subset O$. Since $n(S_1)=n>n(O)/2$ and $n(S_2)=n>n(O)/2$, we may apply Lemma 3 to get that $S_1$ and $S_2$ have a nonempty intersection.

Remark: We actually have proved more than reasonably needed; not only do neighboring pixels in O have intersecting peer groups but any two pixels in O also have intersecting peer groups.

3. GENERAL DETECTION OF OBJECTS IN A GIVEN SIZE RANGE

Suppose that an image operator $O_s$ removes objects of size $\sigma \leq s$ while leaving larger objects invariant or only slightly changed. For $s_1 \leq s_2$, the difference operator $O_{s_1} - O_{s_2}$ removes objects smaller than s1 and larger than $S_2$. That is, $O_{s_1} - O_{s_2}$ is a "band pass" filter for objects in the size range $(s_1, s_2)$.

For example, this approach is used in morphological filtering starting with the work of Georges Matheron, Jean Serra and others in the 1980s. A description of this development and a very complete bibliography can be found in Dougherty [2]. Morphological filters are defined in terms of a structuring set B that can be any bounded subset of $R^2$. (For more general filtering, B can be any bounded subset of $R^m$. For example, to filter a sequence of images prior to determining the optical flow, we could take m=3). The structuring set acts as a probe of the image that measures how well the structuring element fits within the image. In some locations the structure set fits within the image and in other locations it does not; this provides us with a way of extracting information from the image. In addition, the structuring set can be expanded or contracted prior to testing for fit at various locations. Dougherty [2] discusses this view in detail and paraphrases Matheron by saying that the knowledge we obtain depends on our choices regarding the manner of our observations. The correspondence between the structure set, the image object and the information obtained has led to a variety of methods, including genetic search algorithms for selecting the structure set.

Morphological filters set up a scale space decomposition of an image, using the scale space parameter s>0. The two principal operators are dilation $D_s$ and erosion $E_s$ defined by $$D_s u(x,y) \equiv \sup\{u(x_1,y_1):(x_1-x,y_1-y) \in sB\}$$

$$E_s u(x,y) \equiv \inf\{u(x_1,y_1):(x_1-x,y_1-y) \in -sB\}$$

The erosion operator removes certain details from the image and shrinks objects (hence the name erosion). The dilation operator enlarges objects. Combining these operations gives the opening operator $O_s = D_s E_s$. The difference between the opening operation and the identity operation indicates a loss of information in the opening operator. This loss is not necessarily bad since the missing information may be noise or just objects of a certain size. This leads to the definition of the tophat operator $T_s \equiv I - O_s$.

Note that the morphological opening operator $O_s$ can significantly distort the edges of objects larger than s, as the following example shows.

EXAMPLE 5

FIG. 5(a) shows an image with a large rectangular region with a crenelated border and a smaller 3×3 rectangular region. If we want to remove the smaller region with morphological filtering, we can use the opening operator with a 4×4 structuring set. This eliminates the smaller rectangular region but not the larger region. However, the border of the larger region has lost its indentations as seen in FIG. 5(b). FIG. 5(c) shows that this loss of edge information does not occur in PGA filtering with peer group number n=16 and window diameter d=11. (We selected n=16 for comparison with the 4×4 structuring set).

Accordingly, a diffusion based peer group image processing method has been presented that has several natural advantages including edge preservation and enhancement as well as computational speed and ease of implementation, especially in comparison to more computationally intensive methods such as PDE based segmentation schemes. The simplicity of the underlying idea allows many analytic results to be obtained concerning the convergence of the PGA iteration, relations to other methods such as shock filtering and median filtering, and how the choice of parameters affects the resulting approximation. The parameters of the PGA method are directly related to the characteristics of the image objects that are to be enhanced. This is in contrast to most image enhancement methods in which it is unclear how to select the method parameters or weights to achieve a desired result. We are currently extending the PGA approach to vector problems such as color or multi-spectral images and feature vectors associated with texture.

Figure 6:
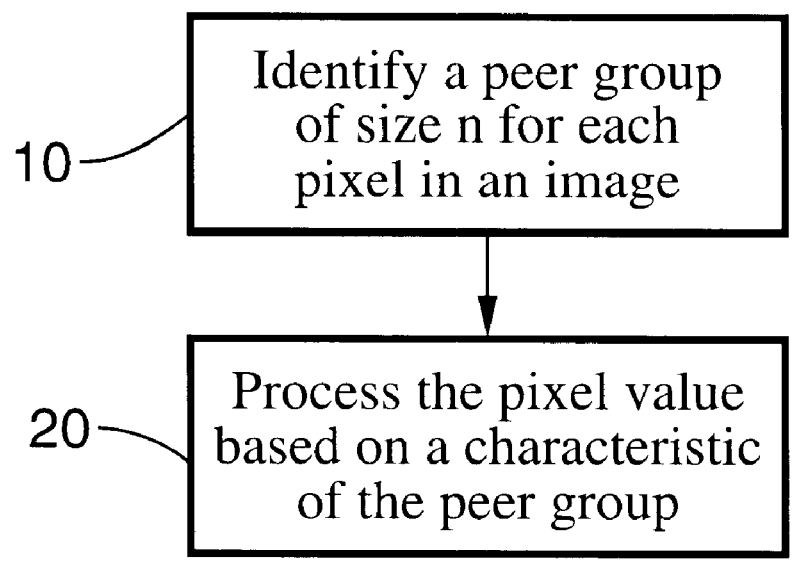
FIG. 6 is a flow chart showing a method for peer group processing according to the invention.

FIG. 6 summarizes the invention thus described. As can be seen, the invention generally comprises two steps to enhance images with n or more pixels. At step 10, a peer group of size n for each pixel is identified, and at step 20 the pixel value is processed based on a characteristic of the peer group. Preferably the peer group comprises a nearby group of similar pixels. The group of similar pixels is identified using a window diameter d and a peer group number n by centering the window at the pixel and selecting the n pixels whose values are closest to the value of the center pixel. Once the peer group is identified, the pixel value is processed by averaging the values of the pixels in the peer group to obtain a new pixel value for the center pixel. Characteristics used to denote similar pixels for peer group identification can include intensity nearness, velocity nearness, texture nearness, color nearness and the like.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A method for enhancing images having n or more pixels, comprising:

using a window diameter d and a peer group number n, selecting a peer group of size n for each pixel in an image from a window centered at the pixel, said peer group comprising the n pixels having values closest to the value of said center pixel; and processing the pixel value based on a characteristic of the peer group.

2. A method as recited in claim 1, further comprising averaging the values of the peer group pixels to obtain a new pixel value for said center pixel.

3. A method as recited in claim 2, further comprising approximating an image from said averaged pixel values.

4. A peer group averaging method for enhancing images having n or more pixels, comprising:
- identifying, at each pixel in an image, a group of nearby similar pixels and designating said nearby group as a peer group;
- wherein said identifying of said group of similar pixels and designating of said nearby group as a peer comprising comprises
  - using a window diameter d and a peer group number n, selecting the peer group for a pixel from a window centered at the pixel, said peer group comprising the n pixels whose values are closest to the value of said center pixel;
  - averaging the values of the peer group pixels to obtain a new pixel value for said pixel; and
  - approximating an image from said averaged peer group pixel values.

5. A method as recited in claim 4, further comprising assigning said n similar pixels to said peer group based on a characteristic selected from the group of characteristics consisting essentially of intensity nearness to said pixel, velocity nearness to said pixel, color nearness to said pixel, and texture nearness to said pixel.

6. A peer group averaging method of image segmentation and enhancement, comprising:
- for each pixel in an image, identifying a peer group of n similar pixels, wherein said peer group is selected from a window of diameter d centered at the pixel, and wherein said n similar pixels are assigned to said peer group based on a characteristic selected from the group of characteristics consisting essentially of intensity nearness to said pixel, velocity nearness to said pixel, color nearness to said pixel, and texture nearness to said pixel;
- averaging said pixels and obtaining a new pixel value for said center pixel; and
- approximating an image from said new pixel values.

* * * * *